United States Patent [19]
Chan et al.

[11] Patent Number: 5,812,197
[45] Date of Patent: Sep. 22, 1998

[54] SYSTEM USING DATA CORRELATION FOR PREDICTIVE ENCODING OF VIDEO IMAGE DATA SUBJECT TO LUMINANCE GRADIENTS AND MOTION

[75] Inventors: Ming Hong Chan, W. Los Angeles; Tristan Savatier, Los Angeles, both of Calif.

[73] Assignee: Thomson Consumer Electronics, Inc., Indianapolis, Ind.

[21] Appl. No.: 438,121

[22] Filed: May 8, 1995

[51] Int. Cl.$^6$ ................................... H04N 9/00
[52] U.S. Cl. .................... 348/416; 348/415; 348/411; 348/412; 348/699
[58] Field of Search .................... 348/420, 699, 348/700, 411, 416, 415, 419, 409

[56] References Cited

U.S. PATENT DOCUMENTS

| | | | |
|---|---|---|---|
| 5,091,782 | 2/1992 | Krause et al. | 358/135 |
| 5,283,645 | 2/1994 | Alattar | 348/384 |
| 5,373,329 | 12/1994 | Niitsu | 348/669 |
| 5,387,938 | 2/1995 | Fukuda et al. | 348/420 |
| 5,424,779 | 6/1995 | Odaka | 348/416 |
| 5,504,530 | 4/1996 | Obikane et al. | 348/413 |
| 5,506,622 | 4/1996 | Kim | 348/402 |
| 5,510,840 | 4/1996 | Yonemitsu et al. | 348/416 |
| 5,526,295 | 6/1996 | Astle | 364/715 |
| 5,535,288 | 7/1996 | Chen et al. | 348/417 |
| 5,543,843 | 8/1996 | Kato et al. | 348/400 |
| 5,543,846 | 8/1996 | Yagasaki | 348/415 |
| 5,543,848 | 8/1996 | Murakami et al. | 348/416 |
| 5,565,921 | 10/1996 | Sasaki et al. | 348/412 |

OTHER PUBLICATIONS

Application Serial No. 08/329,553, filed Oct. 26, 1994, Art Group 2615, *A System For Coding A Video Signal In The Presence Of An Image Intensity Gradient*—P. P. Polit.

*Primary Examiner*—Tommy P. Chin
*Assistant Examiner*—Anand S. Rao
*Attorney, Agent, or Firm*—Joseph S. Tripoli; Ronald H. Kurdyla; Alexander J. Burke

[57] ABSTRACT

An MPEG based video signal compression system reduces picture degradation caused by sub-optimal selection of a prediction mode. A disclosed method produces a compressed video output signal from a video input signal. The video input signal is converted (57) into pixel blocks. Then, a plurality of predicted blocks are formed (60) as representations of an input block. Each predicted block is produced by a different prediction function and has an associated Correlation Factor CF which indicates the degree of correlation between the input block and a predicted block. This factor is obtained (35) by subtracting a measure of a low frequency varying correlation component from an index of correlation. The Correlation Factors are compared (45), and a compressed block associated with the predicted block with the lowest CF value is selected as an output block. This process is repeated for the other input blocks, and the selected compressed output blocks are combined to form the output signal. The decision factor, CF, improves prediction mode selection and image motion estimation in the presence of image fading without the need for fading detection circuitry.

3 Claims, 4 Drawing Sheets

SYSTEM USING DATA CORRELATION FOR PREDICTIVE ENCODING OF VIDEO IMAGE DATA SUBJECT TO LUMINANCE GRADIENTS AND MOTION

FIELD OF THE INVENTION

This invention is related to the field of digital image signal processing and more particularly to a method and apparatus for encoding a video signal containing luminance gradients associated with image fading, such as from normal luminance to black and vice-versa.

BACKGROUND OF THE INVENTION

Digital television transmission channels used in terrestrial or satellite broadcast systems have limited available bandwidth. This means sophisticated digital video data compression techniques must be used to conserve signal bandwidth. Data is compressed in particular formats for transmission and is decompressed upon reception. One such format in common usage is described in the MPEG (Moving Pictures Expert Group) image encoding standard (ISO/IEC 13818-2, November 1993). Video data encoded in this format consists of a sequence of successive pictures, or frames, of encoded data. Certain pictures (I pictures) are intra-coded, that is, encoded only from information within the picture itself. Other pictures (P pictures) are forward predictively coded, that is, encoded using motion compensated prediction from past I pictures or P pictures. The remaining pictures (B pictures) are both forward and backward predictively coded, that is, they are encoded using motion compensated prediction from past or future I pictures or P pictures. Therefore, P and B pictures are predictively encoded so that image reproduction from P or B pictures requires information derived from prior decoded I or P pictures. In contrast, I pictures are not predictively encoded and images may be reproduced from single I pictures, or frames.

Different methods are permitted by the MPEG standard for predictively encoding the P and B pictures. These methods include frame based, field based and "dual prime" encoding. The field or frame to be predictively encoded is divided into blocks, and the blocks are predicted on a block by block basis. In the MPEG standard format, the image block is termed a "macroblock" with a designated size of 16×16 picture elements (pixels). Different methods are permitted by the MPEG standard for predictively encoding the P and B picture macroblocks. These methods include forward/backward frame or field based, and other methods depending on whether or not a motion vector associated with the predicted macroblock is zero in value. These methods are detailed in the MPEG image encoding standard (ISO/IEC 13818-2, November 1993) Annex B Tables B-2 to B-8. Encoder apparatus, prior to transmission, typically predictively encodes P and B picture macroblocks by a plurality of these methods. The various predictions for a given macroblock are then compared in order to identify the optimal prediction method for that particular macroblock.

The predictions are compared using particular decision criteria. The optimal encoding method is identified as the method giving the 'best' predicted data results as measured by these criteria. The macroblock predicted by the optimal encoding method is selected for transmission to the video signal receiver.

Various decision criteria may be used to select the optimal encoding method for any particular section of data. One commonly used method determines the mean squared prediction error (MSE) of the video luminance data. The optimal encoding method is the one with the lowest calculated MSE value. The lowest MSE value indicates a better prediction because it shows less volatility and less guesswork in the predicted values.

The MSE may be interpreted as representing the total error or difference energy between the original and predicted luminance values. This energy may further be interpreted as the sum of a DC error energy component and an AC error energy component. The DC energy component represents the difference in energy that occurs when each of the original luminance values is related to each corresponding predicted luminance value by the same constant factor. An example of such a DC energy difference occurs during fading between two successive image frames. Then, assuming the image scene stays substantially unchanged, the fading of the luminance of the second image relative to the first by a substantially constant factor causes the MSE value to exhibit a high DC energy component. As a result of a high DC error energy component in the MSE value, insufficient weight may be attributed to the visually more significant AC error energy component. Therefore, the MSE value may not accurately reflect the error associated with the various predictions. This may result in a faulty decision being made during the image signal processing, and the selected prediction mode for a particular image block may be less than optimal. As a result, a degraded picture may be displayed.

SUMMARY OF THE INVENTION

A disclosed video signal compression system in accordance with the principles of the present invention reduces picture degradation caused by sub-optimal prediction mode selection. The disclosed video signal compression system operates on individual image blocks, and therefore can reduce the selection of sub-optimal prediction modes where only portions of the image are susceptible to error. This may occur for example, when only portions of the image undergo image fading. The system also improves prediction mode selection in more complex cases where both motion and fading occur within the image. Further, these advantages are realized without requiring fading detection circuitry, which is often elaborate and costly.

The disclosed video signal compression system improves the selection of compressed pixel blocks from a plurality of compressed blocks. A disclosed method provides a compressed video output signal from a video input signal. The video input signal is converted into input pixel block data. Then, a plurality of predicted pixel blocks are formed as representations of an input block. Each predicted block is produced by a different prediction function and has an associated Correlation Factor. The Correlation Factor, CF, indicates the degree of correlation between the input block and a predicted block and is obtained by subtracting a measure of a low frequency varying correlation component from an index of correlation. The Correlation Factors are compared and a compressed block associated with a preferred predicted block is selected as an output block based on the comparison of Correlation Factors. This process is repeated for the other input blocks, and the selected compressed output blocks from the comparisons are combined to form the output signal.

The inventor has recognized that additional advantage may be realized by varying the proportion of the low frequency varying correlation component that is subtracted from the correlation index. This proportion may be varied, for example, at different decision points in a multi-step decision process used to obtain the optimal prediction mode for P and B macroblocks in an MPEG encoding operation. Alternatively, for example, the proportion may be varied dynamically in response to an external parameter indicating a change in the type of picture being displayed.

The new decision criterion, CF, also offers an advantage when it is applied to other decisions made in the encoding operation. For example, in estimating the degree of motion within an image, the criterion CF may be used to determine image element displacement between pictures. A typical motion estimation method identifies a pixel block in a search image which is the closest match in terms of pixel luminance values to a reference pixel block. This identification is commonly made using the MSE (Mean Squared Error) or MAE (Mean Absolute Error) decision criteria, for example. The substitution of the new decision criterion, CF, for these or other criteria improves image motion estimation by reducing the sub-optimal selection of matching image blocks. The new criterion also improves performance when used for motion estimation in the presence of image fading. The inventor has also recognized that both prediction mode selection and motion estimation may be improved by the non-linear combination of the AC and DC energy components of CF.

DETAILED DESCRIPTION OF THE DRAWINGS

Figure 1:
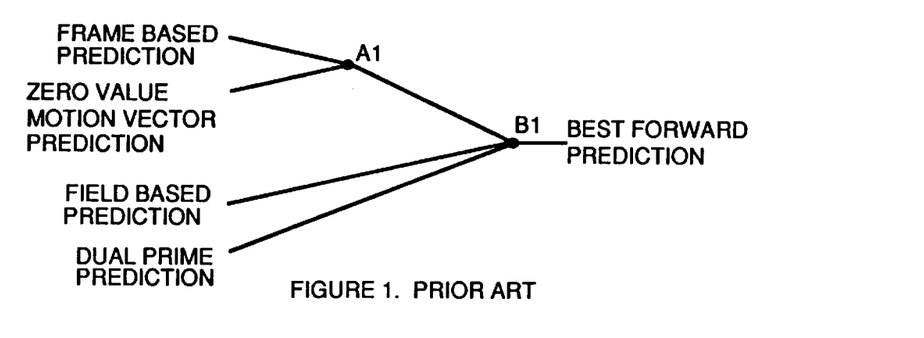
FIG. 1 is a decision tree using a known MSE decision criterion for selecting an optimum macroblock prediction from an exemplary range of macroblock predictions within a P picture in accordance with the MPEG standard.
Figure 2:
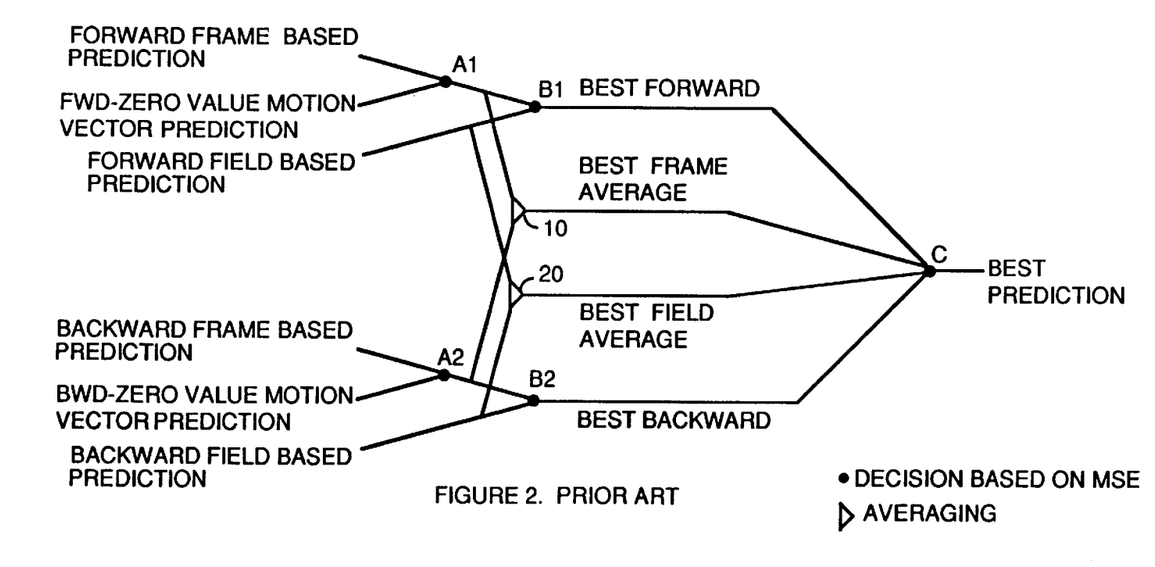
FIG. 2 is a decision tree using the known MSE decision criterion for selecting an optimum macroblock prediction from an exemplary range of macroblock predictions within a B picture.

Various decision criteria may be used to select the optimal encoding method for predictively encoding P and B picture macroblocks according to the MPEG standard. One commonly used criterion is the mean squared prediction error (MSE) of video luminance data. FIG. 1 shows this criterion used in an exemplary decision procedure for selecting the optimum encoding method for a macroblock within a P picture prediction procedure. Similarly, FIG. 2 shows the criterion applied to an exemplary B picture macroblock selection procedure.

In a macroblock containing N pixels where each pixel has a luminance value defining the pixel brightness (gray shade assuming a black and white picture), the MSE value would be given by:

$$MSE = \frac{1}{N} \sum_{i=1}^{N} (\hat{u}_i - u_i)^2$$

where $u_i$, for i=1–N, are the original pixel luminance values and $\hat{u}_i$, for i=1–N, are the predicted pixel luminance values. N equals the number of pixel luminance values in the image block that is being predicted, for example N=256 in the MPEG standard where a 16×16 pixel macroblock is used. The optimal encoding method is the one with the lowest calculated MSE value. The MSE value may be used in other ways. For example, the encoding method may be selected based on the MSE value being below some specified threshold. The lowest MSE value indicates a better prediction because it shows less volatility and less guesswork in the predicted values.

The MSE represents the total error or difference energy between the original and predicted luminance values. This energy may also be considered as the sum of a DC error energy component and an AC error energy component. The DC energy component represents the difference in energy that occurs when each of the original luminance values is related to each corresponding predicted luminance value by the same constant factor. An example of such a DC energy difference between two successive frames occurs during fading. Assuming the image scene stays reasonably the same (motionless), the fading of the luminance of the second image relative to the first image by a substantially constant factor across the image produces a high DC energy component within the MSE value. As a result of a high DC energy component in the MSE value, insufficient weight may be attributed to the visually more significant AC energy component. Therefore, the MSE value may not accurately reflect the error associated with the various predictions. This may result in a faulty decision being made during image signal processing, and the selected prediction mode for a particular image block may be less than optimal.

In the known P picture decision procedure of FIG. 1, the optimal macroblock prediction, the "Best Prediction", is selected from among four alternative predictions. At node A1 either a Frame Based macroblock prediction or a macroblock prediction with a Zero Value Motion Vector is selected. Then, either this selected prediction, a Field Based prediction or a "Dual Prime" prediction is selected at node B1. These types of macroblock prediction are known and are defined in the MPEG image encoding standard (ISO/IEC 13818-2, November 1993) Section 7.6.1 and Annex B Tables B-2 to B-8. The MSE criterion is used at both the A1 and B1 decision nodes in the FIG. 1 decision procedure. This may cause a faulty decision to be made at nodes A1 or B1 or both. This means, for example, that the selected Best Forward prediction could be a Field Based macroblock prediction whereas, in reality, a Frame Based prediction may be optimal.

In the known B picture decision procedure of FIG. 2, the "Best Prediction" is finally selected from among four alternatives. These are the Best Forward, Best Frame Average, Best Field Average and Best Backward predictions. These four alternatives are in turn selected or derived from six original predictions. At node A1 either a Forward Frame Based prediction or a Forward Zero Value Motion Vector prediction is selected. Then, either this selection or a Forward Field Based prediction is chosen at node B1 as the Best Forward prediction. Similarly, at the other two nodes labeled A2 and B2 in FIG. 2, a Best Backward prediction is selected from a Backward Frame Based prediction, Backward Zero Value Motion Vector prediction and a Backward Field Based prediction. In addition, the predicted macroblocks selected at nodes A1 and A2 are averaged at a macroblock averager node 10 to form a Best Frame Average prediction. The Backward Field Based and Forward Field Based predictions are averaged at node 20 to provide a Best Field Average prediction. Finally, the Best Prediction is selected at node C from the Best Forward, Best Frame Average, Best Field Average and Best Backward predictions.

As with the procedure of FIG. 1, the MSE criterion is used at decision nodes A1, A2, B1, B2 and C in the procedure of FIG. 2. This may cause a faulty decision to be made at any or all of these nodes. As a result, for example, the selected Best Prediction could be a Backward Field Based prediction whereas, in reality, a Forward Frame Based prediction may be optimal. The ultimate consequence is that a degraded picture may be displayed.

Figure 3:
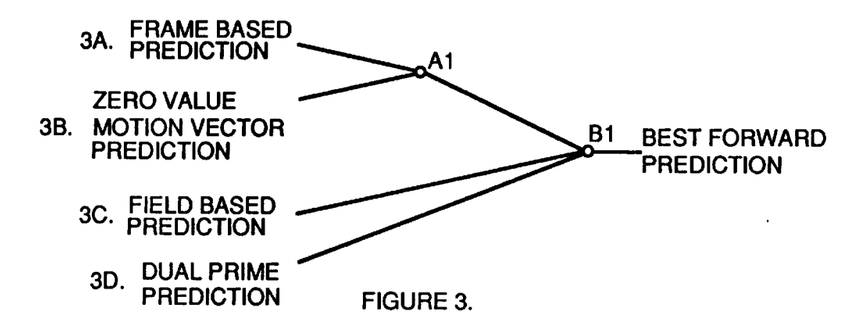
FIG. 3 is a decision tree using a decision criterion CF, in accordance with the present invention, for selecting an optimum macroblock prediction from an exemplary range of macroblock predictions within a P picture.
Figure 4:
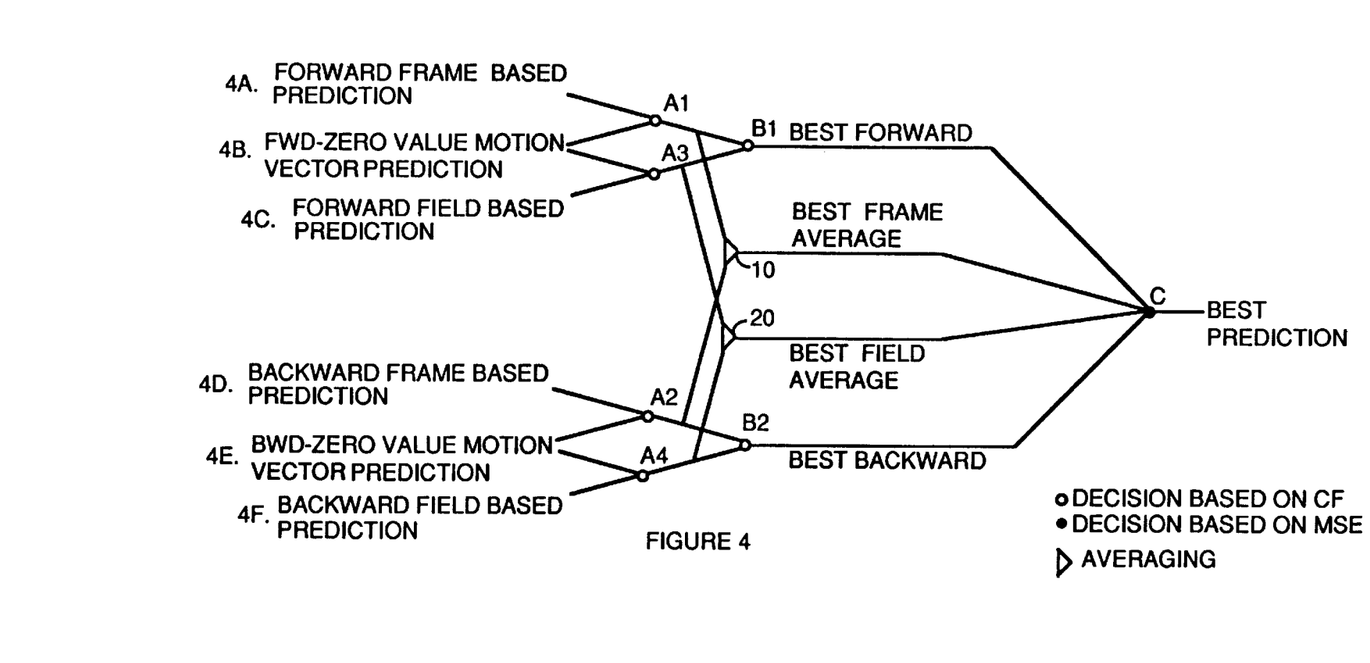
FIG. 4 is a decision tree using the decision criterion CF and the MSE criterion according to the invention for selecting an optimum macroblock prediction from an exemplary range of macroblock predictions within a B picture.

FIGS. 3 and 4 show decision procedures resembling those of FIGS. 1 and 2 respectively, except that a new decision criterion according to the principles of the present invention is used at nodes A1–A4 and B1 and B2. The new criterion, termed the Correlation Factor (CF), significantly improves the decision procedure for selecting the optimal macroblock prediction.

Figure 5:
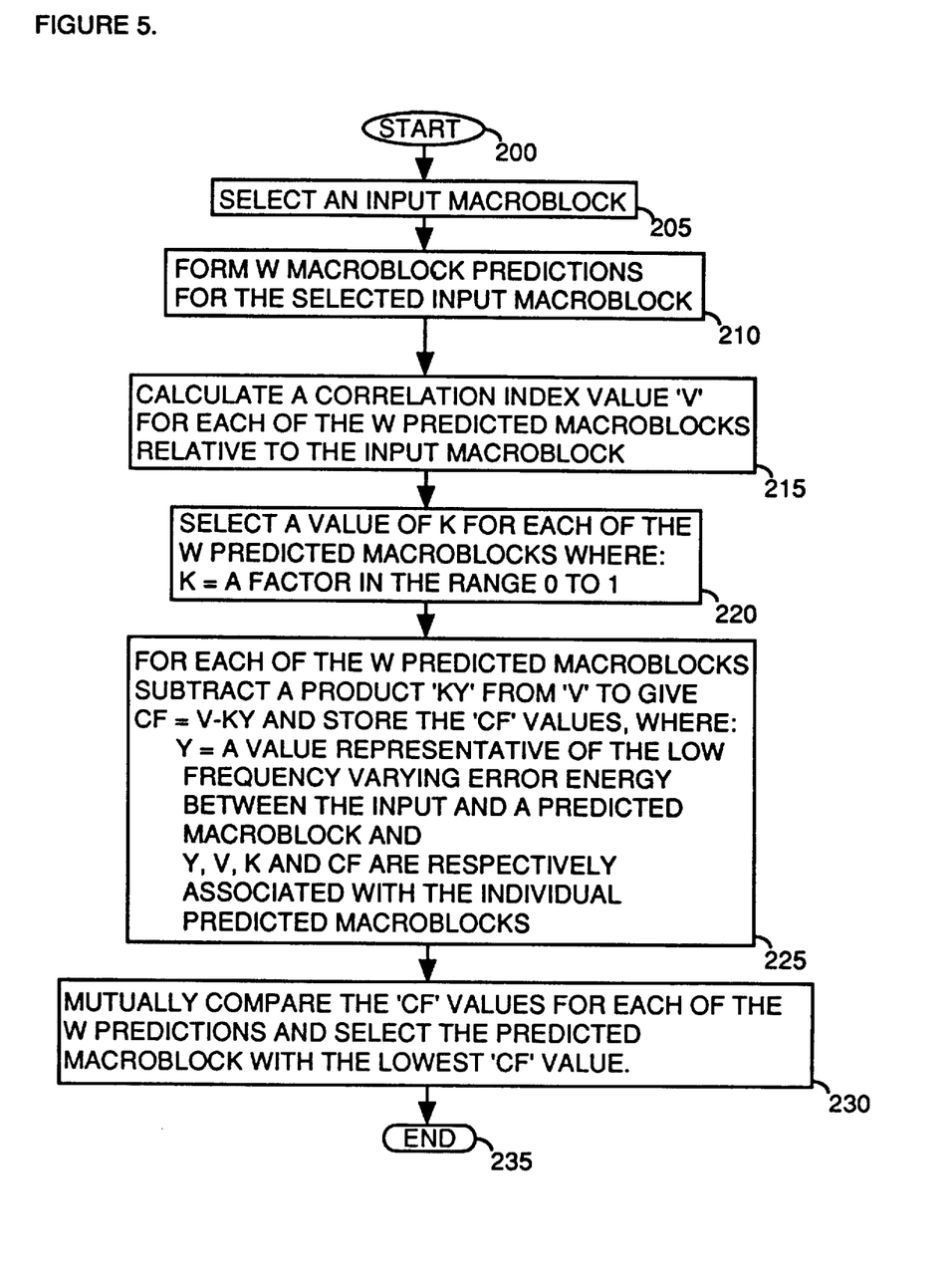
FIG. 5 is a flowchart implementing the new decision criterion, CF, according to the invention to determine the optimal predicted macroblock from a range of predicted macroblocks.

An implementation of one form of the new decision criterion is shown in the flowchart of FIG. 5. The new decision criterion is used at nodes A and B of FIGS. 3 and 4 to select the optimal predicted macroblock from a range of predicted macroblocks. In FIG. 5, a number "W" of predicted macroblocks are formed for an input reference macroblock. Then, a new value of decision criterion 'CF' is calculated for each of the predicted macroblocks. The CF values for each of the predicted macroblocks are then compared, and the predicted macroblock giving the lowest CF value is selected. The procedure of FIG. 5 is repeated for other input macroblocks as required.

In step 205 of FIG. 5, following start block 200, an original input macroblock is selected and its luminance values are stored. Then, in step 210, W different macroblock predictions are formed for the input macroblock and the luminance values for each of the W predicted macroblocks are also stored. These predicted macroblock luminance values are obtained by known prediction methods, such as those discussed in connection with FIGS. 3 and 4 and performed by an MPEG encoding apparatus, for example. Then, in steps 215, 220 and 225, CF values are calculated for each of the macroblock predictions. First, in step 215, an index of correlation 'V' is computed for each of the predicted macroblocks where V represents the sum of AC and DC error energy values. More precisely, V represents the total difference energy between the luminance values of a predicted macroblock and the luminance values of the original macroblock. Then, in step 225, after empirically selecting a value for factor K in the range 0 to 1 in step 220 a product "KY" representing the DC or low frequency varying component of correlation between the associated predicted and original macroblocks is subtracted from correlation index V. This computation is performed for each of the macroblock predictions to produce a value of decision criterion CF for each predicted macroblock. This CF value represents the degree of correlation between the associated predicted and original macroblocks. One form of the new decision criterion, CF, value in an image block containing N pixel luminance values may be given by:

$$CF = V - KY$$

where $CF = \frac{1}{N} \sum_{i=1}^{N} (\hat{u}_i - u_i)^2 - Ke^2$ and $e^2 = \left( \frac{1}{N} \sum_{i=1}^{N} (\hat{u}_i - u_i) \right)^2 = Y$ The term $u_i$ represents the original pixel luminance values, $\hat{u}_i$ represents the predicted pixel luminance values, and N equals the number of pixel luminance values in the image block that is being predicted, for example N=256 in the MPEG standard 16×16 pixel macroblock.

The use of CF as the decision criterion in macroblock prediction selection represents a significant improvement over other methods of selection. This is so even when the total DC or low frequency varying error energy, Y, is subtracted from the correlation index value V in the computation of CF. Parameter CF represents the Mean Squared Error energy less a proportion of the DC picture luminance energy. If K=1, all the DC error energy is removed and CF becomes the variance or AC error energy of the prediction error. If K=0, then CF reverts to the MSE value. However, the inventor has recognized that additional advantage may be attained by varying the proportion of error energy Y that is subtracted from the correlation index value V by varying the factor K. This proportion may be varied by varying K, for example, at different decision points in a multi-step decision procedure used to obtain the optimal prediction mode for P and B picture macroblocks in an MPEG encoding operation. Alternatively, the proportion may be varied dynamically in response to an external parameter. As an example, such a parameter may represent the degree of motion in a picture sequence.

The optimum selected K value for a particular decision depends on the optimum weight to be allocated to the AC error energy relative to the DC error energy within the decision criterion CF value. In turn, the optimum weight allocation is dependent on the application. Varying the K value may also be advantageous in alternative implementations of the decision criterion. These alternative implementations may involve other combinations of the AC and DC error energies. For example, non-linear combinations may be employed that also adjust the weighting of the DC error energy component relative to the AC error energy component in the decision criterion. Such combinations may also be used to improve macroblock prediction selection in conditions such as fading.

Once the CF values have been computed and stored for the macroblock predictions in steps 215, 220 and 225 of FIG. 5, they are compared in step 230. In step 230, the CF values for each prediction type are mutually compared and the optimal macroblock prediction is selected as the one with the lowest calculated CF value. This is the macroblock that is selected for further encoding by transmission apparatus for broadcast to receiver decoding equipment. The FIG. 5 procedure terminates at block 235 for a particular input macroblock. However, the FIG. 5 procedure is repeated as required for other input macroblocks.

Many other implementations of the new decision criterion may be used. For example, the macroblock predictions may not all be performed before the CF values are computed and stored. The predictions may be performed and the CF values calculated in any appropriate order. Furthermore, the optimal macroblock prediction may be selected on a basis other than that of being the macroblock with the lowest CF value.

The P picture optimal macroblock prediction of FIG. 3 is selected from four alternative predictions as in the procedure of FIG. 1. However, unlike FIG. 1, the decision criterion of steps 215–230 of FIG. 5 is used at the A and B decision nodes of FIG. 3. At node A1, one macroblock prediction from either a Frame Based macroblock prediction 3A or a Zero Value Motion Vector prediction 3B is selected. Then, either this selected prediction or a Field Based prediction 3C or "Dual Prime" prediction 3D is selected at node B1.

In the B picture decision procedure of FIG. 4, the decision criterion of steps 215–230 of FIG. 5 is used at the A and B decision nodes, in contrast to FIG. 2 which does not use this criterion. The decision procedure of FIG. 4 also includes two additional decision nodes labeled A3 and A4 that are not present in the FIG. 2 procedure. These two decision nodes provide choices between two types of Field Based prediction 4C, 4F and Zero Value Motion Vector predictions 4B and 4E respectively. As a result, the Best Field Average prediction in FIG. 4 may now be produced using Zero Value Motion Vector predictions 4B, 4E, which is not possible in the FIG. 2 procedure.

The additional nodes produce a further improvement in the FIG. 4 decision procedure. This is because changing a decision procedure in combination with using the new decision criterion may yield improved performance in certain decision procedure applications. A decision procedure may be changed by adding or removing decision nodes depending on the requirements of a particular application. In the FIG. 4 application, the two additional nodes improve the optimal macroblock selection by inserting a comparison check of the Field Based predictions 4C, 4F with Zero Value Motion Vector predictions 4B and 4E respectively. This improves performance when there is fading in a picture without motion.

An additional advantage may be realized by using the new decision criterion in combination with other different decision criterion. For example, in the decision procedure of FIG. 4 an improvement in optimal macroblock selection was achieved by using the new criterion at the A and B nodes, in combination with the use of MSE at node C. The reason for this is that particular decisions may need to be sensitive to the DC error energy content. For example, in FIG. 4, performance is improved by making the decision criterion at node C sensitive to the DC error energy by using MSE as the node C decision criterion. Optimal selection is improved in this case by emphasizing the Best Field and Best Frame averaged options at decision node C, since they typically exhibit low DC error energies.

The remaining FIG. 4 decision procedure is the same as was described in connection with the B picture procedure of FIG. 2. The Best Prediction is ultimately selected at node C from the Best Forward, Best Frame Average, Best Field Average and Best Backward predictions.

The new decision criterion, CF, may be advantageously applied to a variety of other decision procedures. As an example, criterion CF may be used to estimate the degree of image motion during an MPEG encoding operation. A typical motion estimation method relies on identifying a pixel block in a search image (a search block) which is the closest match, in terms of pixel luminance values, to a reference pixel block. This identification is commonly made using the MSE (Mean Squared Error) or MAE (Mean Absolute Error) decision criteria. The substitution of new decision criterion CF for these or other criteria improves image motion estimation by reducing the sub-optimal selection of matching image blocks. As an example of such a substitution, the implementation of CF in the flowchart of FIG. 5 may be used to estimate image motion. In this case the input macroblock becomes the reference pixel block, and the predicted macroblocks are the search pixel blocks. Also, the parameter K is selected in accordance with the principles discussed in connection with FIG. 5. Then, as previously described for the optimal predicted macroblock selection, steps 215–230 of the FIG. 5 flowchart identify the optimal search pixel block as the block with the lowest CF value. In addition, as with the predicted macroblock selection, the new criterion also improves performance when used for motion estimation in the presence of image fading.

Other decision procedures are also possible in MPEG and in other applications. The combination and order of decision criteria, and the form of decision procedure used, in accordance with the present invention, are a function of the requirements of a particular system. The new criterion may improve decision procedures in any application designed for selecting an optimal set of values from a plurality of sets of values.

Figure 6:
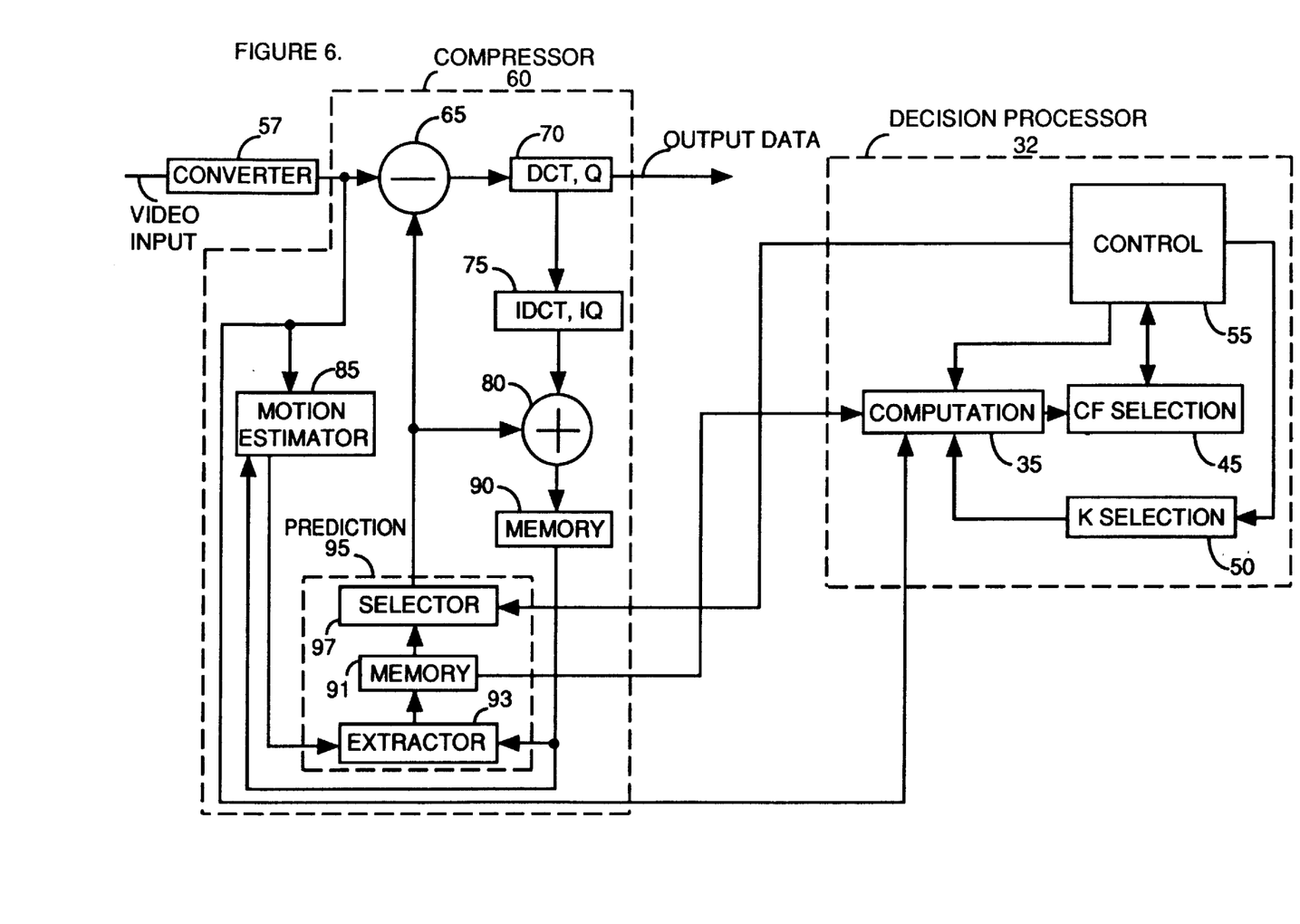
FIG. 6 shows MPEG compatible encoder apparatus in accordance with the principles of the present invention.

FIG. 6 shows MPEG compatible compressor apparatus in accordance with the principles of the present invention. Decision processor 32 implements the new decision criterion presented in the flowchart of FIG. 5. Briefly, a digital video signal in the form of pixel luminance values, is converted into input reference macroblocks by converter 57 as known and input to compressor 60. The system of FIG. 6 operates in an environment, as known, in which the supply of input macroblocks is controlled. This is done to enable the completion of a macroblock prediction cycle and the production of an output compressed block for each input macroblock. Compressor 60 performs different macroblock predictions on each input reference macroblock and stores the resulting macroblock predictions in decompressed form in memory 91 of prediction unit 95. These predictions are "candidate" predictions from which an optimal macroblock prediction for the input reference macroblock may be selected. Both the input reference macroblock that is being predicted and the stored candidate macroblock predictions in memory 91 are input to decision processor 32. Decision processor 32 calculates and compares Correlation Factors, based on this input data, for each of the candidate macroblock predictions corresponding to the input reference macroblock currently being compressed. Processor 32 then provides selection information resulting from this comparison to selector 97 in prediction unit 95. The optimal macroblock prediction is then selected from memory 91 by selector 97 based on this selection information. This optimal macroblock prediction is then subtracted from the input reference macroblock by subtractor 65. The resulting residue from subtractor 65 is then compressed by unit 70 to provide Output Data for further processing for transmission. This process is repeated for each input reference macroblock.

In describing the operation of the FIG. 6 encoder apparatus in more detail, the operation of compressor 60 is considered for I and P picture macroblocks only. The principles of operation of the FIG. 6 apparatus are readily extrapolated to B picture macroblock operation. Initially, assuming the I picture prediction is a frame based prediction, an I frame macroblock is passed unaltered to encoding unit 70 by subtractor 65. Unit 70 performs a Discrete Cosine Transform (DCT) on blocks of 8×8 pixels to generate DCT coefficients, as known. The coefficients are then quantized in unit 70. The combination of DCT and quantization in unit 70 results in many of the DCT frequency coefficients being zero. Unit 70 then run-length and statistically encodes the coefficients to produce long runs of zeros to minimize the output data produced. Consequently, unit 70 compresses the I frame macroblock by eliminating spatial redundancy in the input macroblock data. The resultant compressed I frame macroblock is provided to decompressor 75 which performs the inverse of the DCT and quantization functions performed by unit 70. The output of unit 75 is a reproduction of the I frame macroblock input to compressor 60. The decompressed I frame macroblock is then passed unaltered by adder 80 and stored in memory 90 for predictive compression of subsequent P frame macroblocks. The above described I frame macroblock compression process is repeated until a full I frame of macroblocks is stored in memory 90.

For P frame macroblock prediction, the input P frame reference macroblock currently being predicted is applied to a motion estimator 85. Using known search block methods, unit 85 determines various displacement vectors (motion vectors), field based and frame based, for this reference macroblock which are used by extractor 93 in prediction unit 95 to extract the various candidate macroblock predictions from the preceding frame stored in memory 90. The identified candidate macroblock predictions are the ones most nearly identical to the reference macroblock and are stored by extractor 93 in memory 91. These candidate macroblock predictions include those identified by the field based and frame based displacement vectors, as well as those that correspond to zero value motion vector and dual prime prediction. One of these candidate predictions is selected by selector 97 as the optimal macroblock prediction based on selection information provided by processor 32. Subtractor 65 subtracts, on a pixel by pixel basis, the optimal macroblock prediction output by selector 97 from the input reference P frame macroblock which is to be compressed. The differences or residues output from subtractor 65 are then compressed by unit 70 and processed similarly to the I frame macroblock data. Also, as with the I frame macroblock, the compressed P frame macroblock residues are decompressed by unit 75 before being applied to adder 80. Concurrently, the optimal macroblock prediction which was subtracted by subtractor 65 from the macroblock being predicted, is added back to the decompressed macroblock residues. This is done by selector 97 applying the optimal macroblock prediction values to a second input of adder 80 which adds the data on a pixel by pixel basis to restore the macroblock. This restored P frame macroblock forms part of the reconstructed picture and is stored in memory 90 for predictive compression of subsequent P frame macroblocks.

The input reference macroblock luminance values and the luminance values of the candidate macroblock predictions in memory 91 are provided to computation unit 35 in processor 32. These values are processed by computation unit 35 to give a new decision criterion CF value for each of the candidate macroblock predictions. The 'K' value used within each computation is determined by K value selection unit 50. Unit 50 determines the appropriate K value based on the type of macroblock prediction selection that the apparatus of FIG. 6 is making. The optimum selected K value for a particular decision depends on the optimum weight to be allocated to the AC error energy relative to the DC error energy within the decision criterion CF value. For example, if the apparatus is being used to make decisions within the B picture decision procedure of FIG. 4, K may be allocated different values at nodes A1, A2, A3, A4, B1 and B2 depending on the optimum weighting for these particular decisions. For the selection made at node C the value of K is set to zero so that the CF computation in effect becomes an MSE computation.

Control unit 55 controls the optimal macroblock prediction selection by controlling the individual unit functions and the sequence of operations of processor 32. Signals provided from unit 55 to K selection unit 50 identify the particular decision being made. Also, the appropriate K value for each decision is stored within unit 50. Therefore, unit 50 obtains the appropriate K value for that particular decision from memory and provides it to computation unit 35. Computation unit 35 uses the K value from unit 50 to calculate a new decision criterion CF value for each of the predicted macroblocks. Unit 45 compares the CF values calculated by unit 35, and provides output signals to unit 55 identifying the optimal predicted macroblock. This is the predicted macroblock with the lowest CF value. Unit 55 then provides selection information to selector 97 of prediction unit 95. On the basis of this selection information from unit 55, the optimal macroblock prediction is selected from memory 91 by selector 97. This optimal macroblock prediction is then subtracted by subtractor 65 from the input reference macroblock. Finally, the resultant residue is then compressed by unit 70 to provide Output Data for further processing prior to transmission, e.g. by a transport processor which forms the Output Data into data packets including identification headers. This process is repeated for each input reference macroblock.

The apparatus of FIG. 6 may be implemented in other ways. The compressed data representing the candidate macroblocks output by unit 70 could be stored in an additional memory. Then, once decision processor 32 has identified the optimal prediction mode, as described in connection with FIG. 6, the corresponding compressed macroblock may be selected as Output Data under control of processor 32 from this additional memory. This has the advantage that since compressed data is generated for each candidate macroblock prediction, more information is available concerning their individual merit in terms of the number of bits, or bandwidth, required for transmission. This additional information may be used by processor 32 as additional criteria for optimal macroblock selection.

Unit functions 35, 45, 50 and 55 in FIG. 6 may be implemented in whole or in part within a microprocessor. In addition, there are other known configurations of compressor 60 and ways of implementing the compressor 60 functions. For example, a prediction for an input reference macroblock may be achieved by using a multiple parallel prediction method as an alternative to a serial prediction method. This involves the use of parallel versions of compressor 60 with each predictor simultaneously producing a different macroblock prediction for a current input reference macroblock. The macroblock predictions are provided to decision processor 32 for optimal macroblock selection as described before.

What is claimed is:

1. A method for providing compressed video output data, comprising the steps of:
   (a) providing video input data;
   (b) converting said video input data into image representative input pixel blocks;
   (c) for an input pixel block, forming a plurality of predicted pixel blocks each produced by a different prediction function, each of said predicted blocks also having an associated Correlation Factor obtained by excising a measure of a low frequency varying correlation component from an index of correlation to indicate a degree of correlation between said input block and a predicted block;
   (d) mutually comparing said predicted block Correlation Factors;
   (e) selecting one of said predicted blocks based on said mutual comparison of the respective predicted block Correlation Factors;

(f) compressing said selected predicted block to provide an output block;

(g) repeating steps (c)–(f) for other pixel blocks; and (h) combining output blocks produced in step (f) to form said output data wherein in step (c) said Correlation Factor is obtained by subtracting a variable measure of the low frequency varying correlation component from said index of correlation wherein step (c) further includes the step of selecting said variable measure of the low frequency varying correlation component to minimize said Correlation Factor.

2. In an MPEG image processing system, a method for providing compressed video output data, comprising the steps of:

(a) providing video input data;

(b) converting said video input data into image representative input pixel macroblocks;

(c) for an input pixel macroblock, forming a plurality of predicted macroblocks each produced by a different prediction function, each of said predicted macroblocks also having an associated Correlation Factor obtained by excising a measure of a low frequency varying correlation component from an index of correlation, to indicate a degree of correlation between said input macroblock and a predicted macroblock;

(d) mutually comparing said predicted macroblock Correlation Factors;

(e) selecting one of said predicted macroblocks based on said mutual comparison of the respective predicted macroblock Correlation Factors;

(f) compressing said selected predicted macroblock to provide an output macroblock;

(g) repeating steps (c)–(f) for other pixel macroblocks; and (h) combining output macroblocks produced in step (f) to form said output data wherein in step (c) said measure is varied between two different predicted macroblocks.

3. In a video signal compression system, apparatus for processing video input data in the form of pixel blocks to produce compressed video output data at an output terminal comprising:

a compression network responsive to said input pixel blocks and providing a plurality of predicted blocks and associated compressed blocks, for an input block;

a computation network for computing a Correlation Factor for each block of said plurality of predicted blocks to indicate a degree of correlation between said input block and said predicted block, wherein, each Correlation Factor is obtained by excising a measure of a low frequency varying correlation component from an index of correlation;

means for selecting one of said plurality of compressed blocks based on a mutual comparison of said predicted block Correlation Factors; and means for conveying said selected compressed block to said output terminal wherein said computation network further includes means for setting said measure to a value that adjusts the relative magnitude of an AC component of said low frequency varying correlation component with respect to the magnitude of a DC component of said low frequency varying correlation component to a predetermined value.

* * * * *